US006912468B2

(12) United States Patent
Marin et al.

(10) Patent No.: US 6,912,468 B2
(45) Date of Patent: Jun. 28, 2005

(54) METHOD AND APPARATUS FOR CONTEMPORANEOUS UTILIZATION OF A HIGHER ORDER PROBE IN PRE-STACK AND POST-STACK SEISMIC DOMAINS

(75) Inventors: Irina A. Marin, West Sussex (GB); Thomas Gehrmann, Hundvaag (NO)

(73) Assignee: WesternGeco, L.L.C., Houston, TX (US)

( * ) Notice: Subject to any disclaimer, the term of this patent is extended or adjusted under 35 U.S.C. 154(b) by 56 days.

(21) Appl. No.: 10/661,897

(22) Filed: Sep. 12, 2003

(65) Prior Publication Data

US 2005/0038605 A1 Feb. 17, 2005

Related U.S. Application Data

(60) Provisional application No. 60/495,055, filed on Aug. 14, 2003.

(51) Int. Cl.[7] .............................. G01V 1/28; G01V 1/00
(52) U.S. Cl. ........................................... 702/14; 367/73
(58) Field of Search ............................ 702/14; 703/10; 707/102; 715/700; 345/619; 367/73

(56) References Cited

U.S. PATENT DOCUMENTS

| | | | | |
|---|---|---|---|---|
| 3,622,967 | A | | 11/1971 | Foster ........................ 340/15 |
| 5,392,213 | A | | 2/1995 | Houston et al. ............ 364/421 |
| 6,028,819 | A | | 2/2000 | Mullarkey et al. ............ 367/37 |
| 6,035,255 | A | | 3/2000 | Murphy et al. ............... 702/11 |
| 6,044,328 | A | | 3/2000 | Murphy et al. ............... 702/11 |
| 6,070,125 | A | | 5/2000 | Murphy et al. ............... 702/11 |
| 6,240,370 | B1 | * | 5/2001 | Sonneland et al. ............ 702/17 |
| 6,535,818 | B1 | | 3/2003 | Baeten ........................ 702/17 |
| 6,708,118 | B2 | * | 3/2004 | Stark ........................... 702/16 |
| 6,735,527 | B1 | * | 5/2004 | Levin .......................... 702/14 |
| 6,765,570 | B1 | * | 7/2004 | Cheung et al. ............. 345/420 |

OTHER PUBLICATIONS

Delaney, VizSim Technology Helps Find Oil Faster, Mar./Apr. 1999 IEEE Computer Graphics and Applications.*
Bancroft, Review of Seismic Imaging: Prestack, 2001, CREWES Research Report, vol. 13, pp. 551–571.*
Dorn, Computing and Visualization, Jun. 2002, the Leading Edge, pp. 581–586.*
Gao, Volume Texture Extraction for 3D Seismic Visualization and Interpretation, Jul.–Aug. 2003, Geophysics, vol. 68, No. 4, pp. 1294–1302.*
Wolfe et al., Interactive Visualization of 3D Seismic Data: A Volumetric Method, 1988 IEEE Computer Graphics & Applications.*
Farmer et al., Structural Imaging: Toward a Sharper Subsurface View, Jan. 1993, Oilfield Review, pp. 28–41.*

(Continued)

*Primary Examiner*—Bryan Bui
*Assistant Examiner*—Toan M. Le
(74) *Attorney, Agent, or Firm*—WesternGeco, L.L.C.

(57) ABSTRACT

A method for contemporaneously utilizing seismic data in the pre-stack seismic domain and the post-stack seismic domain is disclosed. The method includes initiating a higher order probe at a three-dimensional coordinate in a post-stack seismic volume; and instantiating a pre-stack seismic data content for the higher order probe. In alternative aspects, the invention includes a program storage medium encoded with instructions that, when executed by a computer, perform the method and a computer programmed to perform the method.

64 Claims, 4 Drawing Sheets

OTHER PUBLICATIONS

Frohlich et al., Exploring Geo–Scientific Data in Virtual Environments, 1999 IEEE, pp. 169–173.*

"Society of Exploration Geophysicists Annual Conference and Exposition—Dallas 2003", *Technology Watch Report*, 2003 The Data Room, SEG Dallas 2003.

Landmark Press Release. *Landmark Releases ProMAGIC Server—Integration software connects ProMAX and GeoProbe for Rapid Prospect Generation*... Retrieved Jun. 8, 2004, from http://www.lgc.com/news/pressreleases/20031027–landmark+release+promagic.htm.

Landmark. *ProMAGIC Server integrates ProMAX® seismic processing with the 3–D visualization environment of GeoProbe® for rapid prospect generation*. Retrieved Jun. 8, 2004 from http://www.lgc.com/productsservices/geophysicaltechnologies/promagic/default.htm (total of 8 pages).

Schoenberger M: "Optimum Weighted Stack for Multiple Suppression" Geophysics, Society of Exploration Geophysicists. Tulsa, U.S., vol. 61, No. 3, May 1, 1996, pp. 891–901, XP000620778, ISSN: 0016–8033.

* cited by examiner ered to as "post-stack" but are referred to as "pre-stack" if derived
METHOD AND APPARATUS FOR CONTEMPORANEOUS UTILIZATION OF A HIGHER ORDER PROBE IN PRE-STACK AND POST-STACK SEISMIC DOMAINS This application claims the earlier effective filing date of co-pending Provisional U.S. patent application, Ser. No. 60/495,055, entitled METHOD AND APPARATUS FOR CONTEMPORANEOUS UTILIZATION OF A HIGHER ORDER PROBE IN PRE-STACK AND POST-STACK SEISMIC DOMAINS, filed Aug. 14, 2003, in the name of Irina Apostoiu Marin et al.

BACKGROUND OF THE INVENTION

1. Field of the Invention

The present invention pertains to analysis of seismic data and, more particularly, to the contemporaneous use of seismic data in the pre-stack and post-stack seismic domain.

2. Description of the Related Art

Seismic prospecting generally involves generating one or more sets of seismic data regarding a subterranean geological formation. A variety of techniques analyze seismic data with the goal of identifying characteristics of the geological formation that may indicate the presence of hydrocarbon deposits. These techniques may generally referred to as "processing" and "interpretation" tasks.

One common technique is called "stacking." Stacking is a process in which traces (i.e., seismic data recorded from a single channel of a seismic survey) are added together from different records to reduce noise and improve overall data quality. Characteristics of seismic data (e.g., time, frequency, depth) derived from stacked data are referred to as "post-stack" but are referred to as "pre-stack" if derived from unstacked data. More particularly, the seismic data set is referred to as being in the pre-stack seismic domain if unstacked and in the post-stack seismic domain if stacked. Note that the seismic data set can exist in both domains simultaneously in different copies.

The pre-stack and post-stack seismic domains are tightly interrelated. Post-stack seismic data is obtained by stacking pre-stack seismic data that have been "corrected" or "migrated" with a velocity model. A velocity model is obtained from the seismic moveout with the offset of the kinematically exploitable pre-stack seismic events (usually primary reflections). Primary reflectors are structural indicators in the post-stack seismic domain. Structural information can help distinguishing between primary and multiple energies for velocity analysis and update, and so on.

Historically, the pre-stack seismic domain has been perceived as specific to the seismic processing task while the post-stack seismic domain is associated with the seismic interpretation task. For various reasons, the two domains were generally treated independently. However, dependencies are a fact and their exploitation could be hugely beneficial for both the processing and interpretation tasks.

Interpretation of post-stack seismic domain data includes a "visualization" of the data. Typically, such a visualization is a graphical display of the data. Some software packages permit contemporaneous display of the seismic data in multiple seismic domains, and each display may be referred to as a "visualization canvas." A number of software applications are commercially available for the express purpose of creating visualizations of post-stack seismic data for analysis. Some of these packages include features that permit, for instance, the analyst to rotate the visualization about a specified point.

The present invention is directed to resolving, or at least reducing, one or all of the problems mentioned above.

SUMMARY OF THE INVENTION

The invention is, in a first aspect, a method for contemporaneously utilizing seismic data in the pre-stack seismic domain and the post-stack seismic domain, comprising: initiating a higher order probe at a three-dimensional coordinate in a post-stack seismic volume; and instantiating a pre-stack seismic data content for the higher order probe. In alternative aspects, the invention includes a program storage medium encoded with instructions that, when executed by a computer, perform the method and a computer programmed to perform the method.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
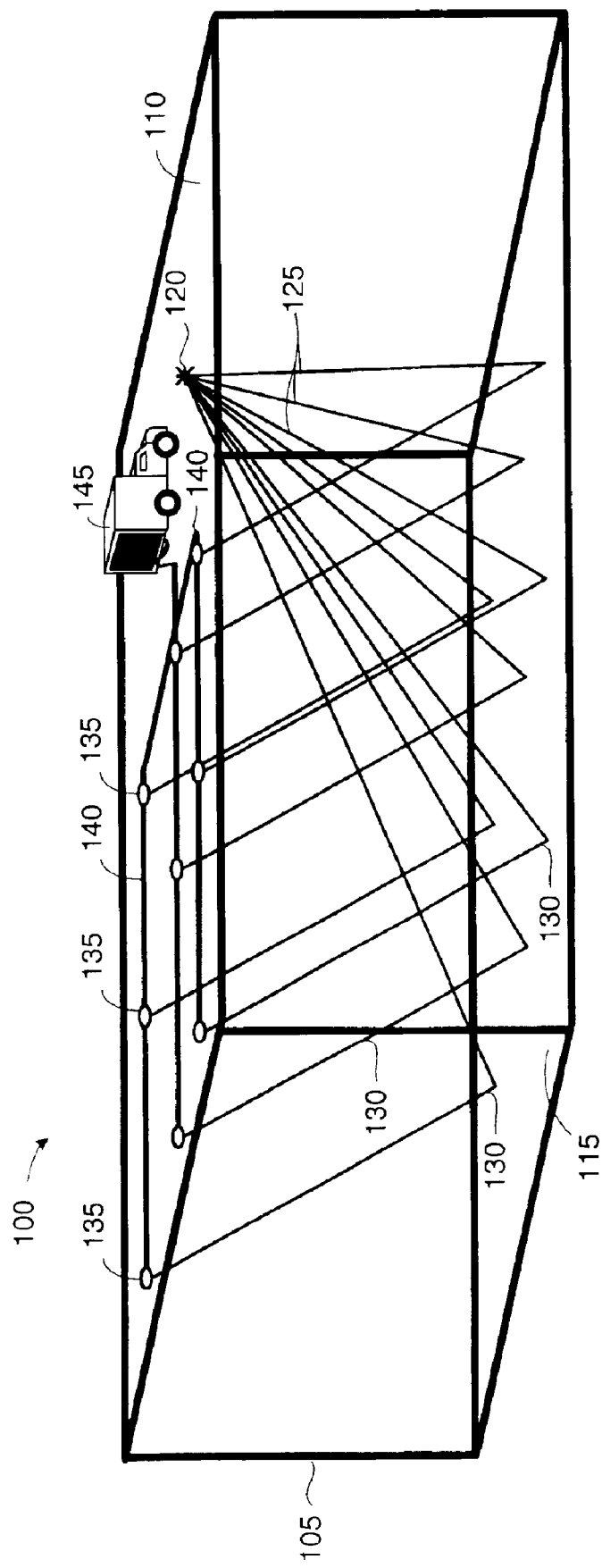
FIG. 1 depicts, in a conceptualized fashion, a land-based survey of a subterranean geological formation generating seismic data such as that which the present invention may be practiced.

FIG. 1 depicts, in a conceptualized fashion, a land-based survey 100 of a subterranean geological formation 105 generating a set of seismic data such as that which the present invention may be practiced. The geological formation 105 includes, in the illustrated embodiment, the surface 110 and a reflector 115. The geological survey 100 includes an elastic source 120 that imparts elastic waves 125 (only three indicated) into the geological formation 105. The elastic waves 125 will comprise a compressional wave ("P-wave") and, sometimes, a shear wave ("S-wave"), neither of which are shown. The component(s) of the elastic wave 125 are reflected, and may be converted, by the reflector 115, and the reflections 130 (only three indicated) are received by a plurality of seismic sensors 135 (only three indicated). The seismic sensors 135 generate electrical signals (not shown) representative of the received reflections 130. The electrical signals are embedded with information regarding the geological formation 105. The electrical signals are transmitted over the lines 140 (not all indicated) to a recording truck 145, where they are captured as seismic data.

Those skilled in the art having the benefit of this disclosure will appreciate that this illustration is highly idealized. For instance, most surveys will be of formations deep beneath the surface. The formations will typically include multiple reflectors, some of which will include dipping events, and will generate multiple reflections (including wave conversion) for receipt by each of the seismic sensors. Furthermore, the present invention may be performed on virtually any seismic data, regardless of how acquired. The seismic survey 100 may therefore, in alternative embodiments, be a subsea survey or conducted in transitional zones between land and water. The information embedded in the electrical signals generated by the seismic sensors may also, in some embodiments, be transmitted wirelessly.

Figure 2:
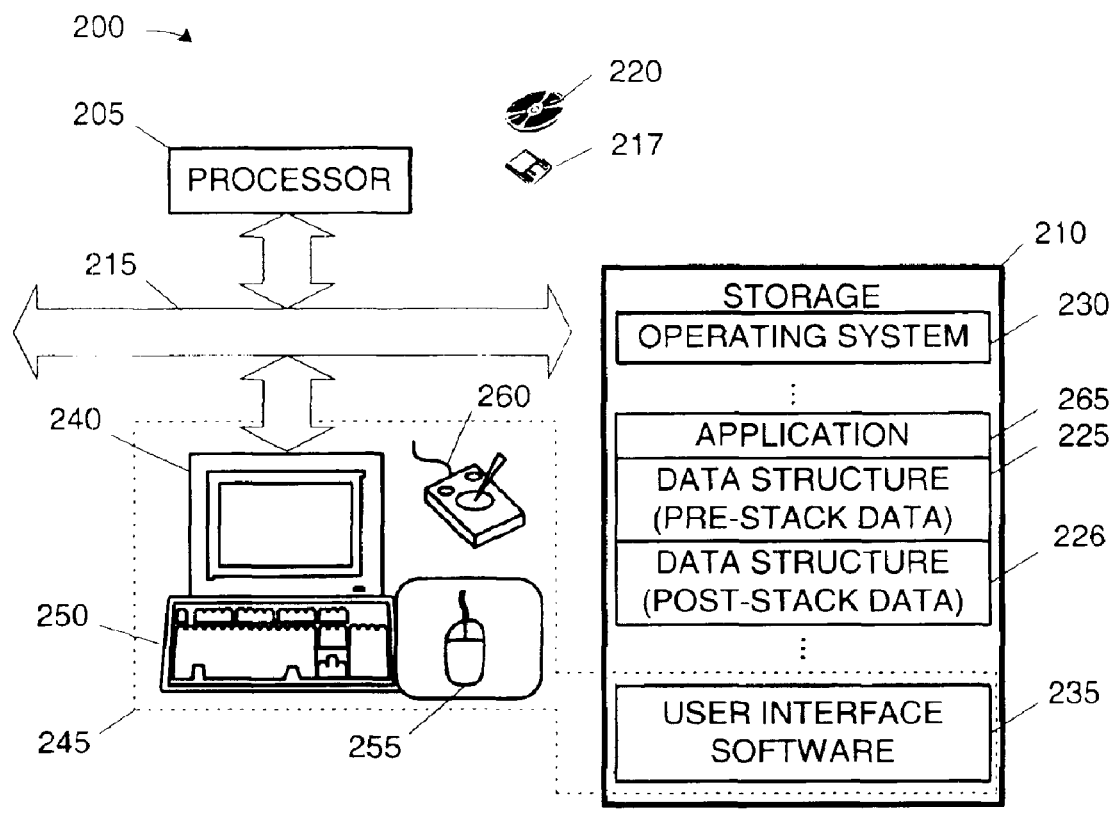
FIG. 2 conceptually illustrates a computing apparatus with which the present invention may be practiced.

Once captured, the seismic data is then processed in accordance with conventional practice into its pre-stack and post-stack seismic domains. FIG. 2 illustrates an exemplary computing apparatus on which the processing may be performed. The computing apparatus 200 includes one or more processors 205 communicating with storage 210 over a bus system 215. The storage 210 may include a hard disk and/or random access memory ("RAM") and/or removable storage such as a zip magnetic disk 217, a removable hard drive (not shown), or an optical disk 220. The storage 210 is encoded with one or more data structures 225, 226 storing the seismic data set acquired and processed as discussed above (in both the pre-stack and post-stack seismic domains), an operating system 230, user interface software 235, and an application 265.

The present invention employs visualizations of the seismic data, as will be discussed further below, with which the user may interact. The user interface software 235, in conjunction with a display 240, implements a user interface 245. The user interface 245 may include peripheral I/O devices such as a keypad or keyboard 250, a mouse 255, or a joystick 260. In the illustrated embodiment, the user interface 245 is a graphical user interface ("GUI"), but any suitable interface known to the art may be employed. Alternative embodiments, not illustrated, may employ "virtual reality" type interfaces, including peripherals such as virtual reality goggle devices, in addition to, or in lieu of, a GUI.

The processor 205 runs under the control of the operating system 230, which may be practically any operating system known to the art. The application 265 is invoked by the operating system 230 upon power up, reset, or both, depending on the implementation of the operating system 230. In the illustrated embodiment, the application 265 processes relatively large volumes of the seismic data for graphical display, and so is relatively computationally intensive. Thus, the processor 205 should be relatively powerful, and may be implemented as a processor set including a general purpose microprocessor with a graphics co-processor. Similarly, the computing apparatus 200 may be implemented as a workstation. However, this is not necessary to the practice of the invention, and any suitable computing apparatus may be employed.

Note that the physical location at which the processing occurs is not material to the practice of the invention. The seismic data may be processed at the point of collection, e.g., aboard the recording truck 145 in FIG. 1, but this is unlikely. The seismic data will typically be processed at some processing facility remote from where it is collected. The seismic data may be transported in any convenient manner. For instance, the seismic data can be wirelessly transmitted to the processing facility, or transmitted over a network (e.g., a wide area network ("WAN") or the Internet), or may be encoded on a storage medium that is then physically transported to the processing facility.

The seismic data, once processed into the pre-stack and post-stack seismic domains, is then generated into a visualization canvas that is displayed to a user. The visualization may be performed in any manner known to the art. In the illustrated embodiment, the display is a graphical display on the monitor 240 through the user interface 245. However, the invention is not so limited. For instance, the visualization may be projected. The manner in which the visualization is displayed to the user is not material to the practice of the invention.

Figure 3:
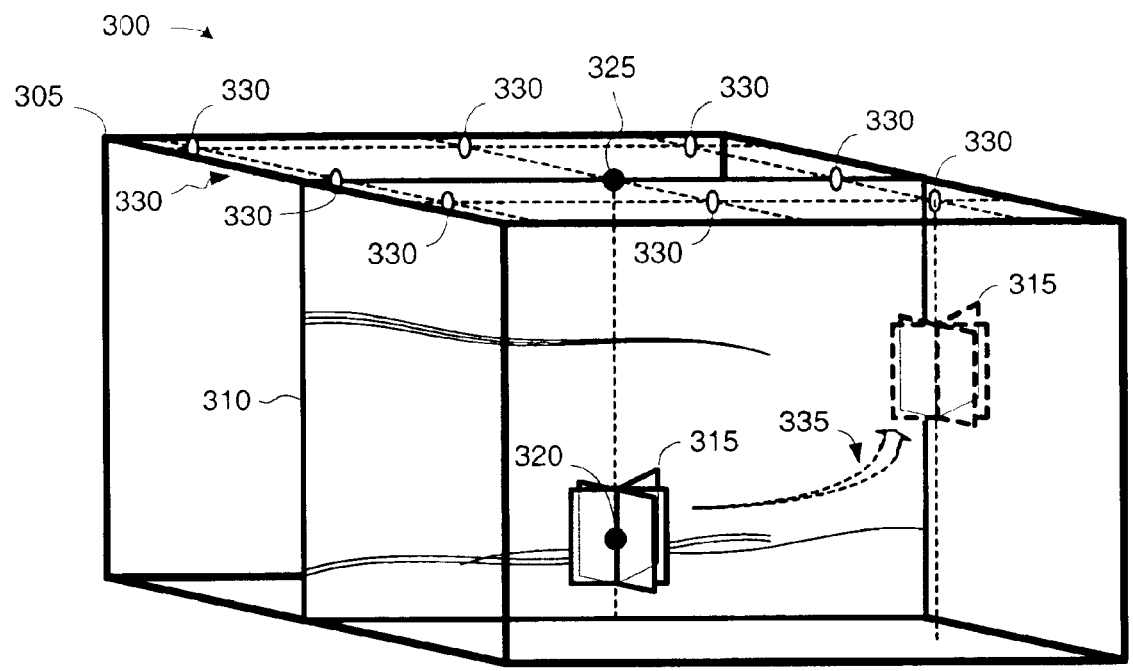
FIG. 3 depicts a conceptualized visualization of the geological formation of FIG. 1 in the form of a volume of seismic data in the post-stack seismic domain, and a higher order probe in accordance with the present invention employed in accordance with one particular embodiment of the present invention.

FIG. 3 depicts a conceptualized three-dimensional ("3D") visualization 300 of a portion of the geological formation 105 of FIG. 1 in one particular embodiment of the present invention. The visualization 300 is of a volume 305 of seismic data in the post-stack seismic domain stored, for example, in the data structure 226, shown in FIG. 2. The visualization 305 includes a two-dimensional ("2D") post-stack slice 310 of the seismic data. Those in the art having the benefit of this disclosure will appreciate that the depiction of the visualization 300 is highly conceptualized. Visualizations of the sort referred to here typically convey a greater amount of information. Furthermore, the depiction of the slice 310 does not necessarily convey a visualization as would be generated from a flat reflector without dipping events, such as the reflector 115 in FIG. 1. Note that techniques for generating 3D visualizations of the sort represented by the volume 305 are known to the art, and any such technique may be used.

The volume 305 is populated with post-stack seismic data in time or depth domain. Post-stack seismic data, in the context of the invention, may also include pseudo post-stack seismic data such as common offset (in time or depth) data, velocity fields (in time), Earth/velocity model (in depth) data, structural frameworks (i.e., post-stack seismic interpreted and modeled data) or seismic navigation data only (such as sources locations or receiver locations) In general, the volume 305 may be any visualized 3D space or volume in time or depth where 3D post-stack seismic data, 3D common offset data (including zero-offset data, which is often assimilate to the post-stack seismic data), or 3D velocity data is rendered, based on their geographical positioning. As those in the art having the benefit of this disclosure will appreciate, the geographical positioning will be a function of the acquisition or processing geometry.

Figure 4:
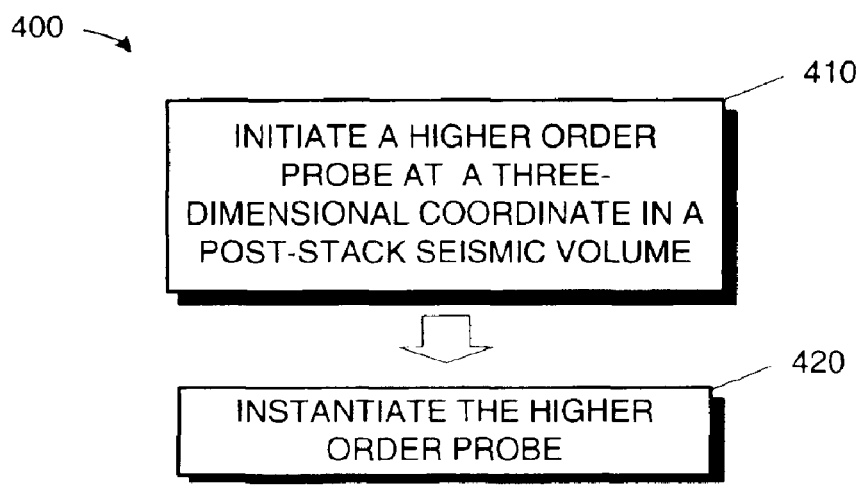
FIG. 4 illustrates a method practiced in accordance with the present invention.

FIG. 4 illustrates a method 400 for utilizing seismic data practiced in accordance with the present invention. Referring to both FIG. 3 and FIG. 4, the method 400 begins (at 410) by initiating a higher order probe 315 at a 3D coordinate 320 in the post-stack seismic volume 305. The phrase "higher order," as used herein, means the probe is defined in four or more dimensions. The available dimensions will be a function of the pre-stack seismic data with which it will eventually be populated, as will be discussed in greater detail below. Note that, in the embodiment illustrated in FIG. 3, the higher order probe 315 does not extend the full vertical length of the 3D coordinate 320 on which it is defined. However, in some alternative embodiments, the higher order probe 315 may do so.

Figure 5:
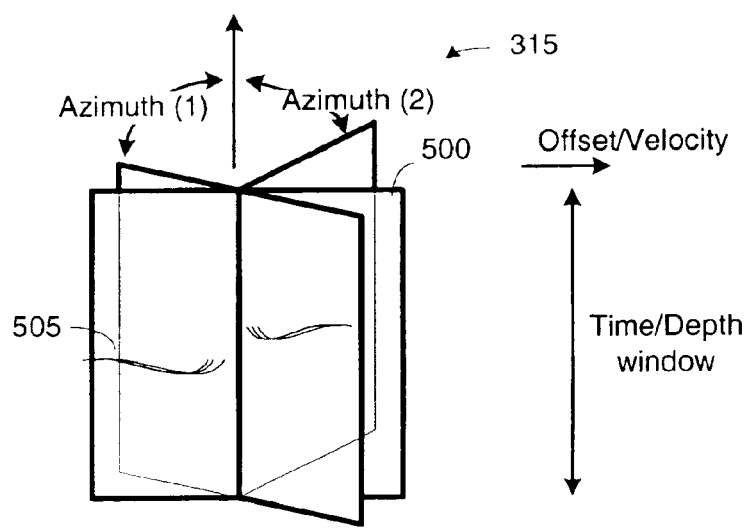
FIG. 5 depicts one particular embodiment of the higher order probe of FIG. 3.

More particularly, initiating the higher order probe 315 includes defining a frame 500, best shown in FIG. 5, populated with pre-stack seismic data, as shown in FIG. 3, and as will be discussed further below. In some embodiments, a user may define the frame 500 interactively, e.g., graphically through the user interface 245, shown in FIG. 2. Depending on the type of post-stack seismic data with which the volume 305 is populated, the dimensions may be specified in, for example, an offset/velocity, azimuth, time/depth window. In alternative embodiments, the dimensions of the frame 500 may be specified by default to specifications stored, for instance, in the storage 210, shown in FIG. 2. In some embodiments, the user can also specify selected characteristics of the higher order probe 315. For instance, the user may specify a "type" for the probe. Exemplary types include, but are not limited to, pre-stack seismic data such as a common midpoint gather ("CMP"), a common conversion point gather ("CCP"), a common image point ("CIP") gather, a common shot gather ("CSG"), a common receiver gather ("CRG"), and velocity panels such as a semblance panel (a Vs or Vp semblance panel in time), a gamma scan (Vp/Vs semblance panel), a focusing panel (which is a semblance panel in depth), etc.

The higher order probe 315 may be initiated at a trace location practically anywhere within the post-stack seismic volume 305 of the visualization 300. Data points comprising a geographic position and either time or depth found in both the pre-stack seismic data and the post-stack seismic data may be used if they exist and the context makes sense. Otherwise, geographical positions alone may be used (e.g., for CSG or CRG). For instance, the higher order probe 315 may be initiated at a binning location (such as a common midpoint ("CMP") location, a CCP location or a CIP location) or a navigation location (such as source location or receiver location). A suitable binning location may be, for example, a velocity analysis/update location, which is usually a part of a subset of the binning locations. A map of those lateral locations can be presented, and the user can choose one of the presented locations.

If a pre-stack interpretation already exists, a 3D distribution map of the pre-stack interpretation can be presented to guide to user for initiating and afterward moving/translating the probe. In this alternative, the map can be superimposed on the visualization canvas. In the illustrated embodiment, the higher order probe 315 is initiated at the active location given by the point/position 320, which is at a pre-stack lateral location 325. A map comprised of several locations 330, including the location 325, is shown superimposed on the volume 305. The point 320 can be a point with a pre-stack interpretation. A map such as the map in FIG. 3 need not be used in all embodiments, provided the user or the system knows where in the volume 305 3D coordinates may be found.

Returning now to both FIG. 3 and FIG. 4, once the higher order probe is initiated (at 410), the method 400 then instantiates (at 420) the pre-stack seismic data content of the frame 500 (shown in FIG. 5) of the higher order probe 315 at the 3D coordinate 320. Instantiation generally includes random access of pre-stack gathers or velocity gathers from the data storage and materializing them in the frame 500. In contrast to conventional practice, the traces instantiated into the frame 500 are not necessarily loaded from predefined volumes with traces where the trace headers have been adjusted for convenience, although this may be the case in some embodiments. However, some embodiments may follow conventional practice by loading from pre-sorted or pre-processed data sets. Returning to the illustrated embodiment, traces are stored in the data structure 225 in the storage 210, shown in FIG. 2, and they are accessed/read in a random way, as opposed to the sequential access employed by the classic "loading", and instantiated in the frame. As used in this context, random means that the application 265 can access the traces to be materialized directly, or purely based on the gathering criteria, as opposed to sequentially, or as required by a predefined storage or loading of the data. The frame 500, previously specified when the higher order probe 315 is initiated (at 410), defines this pre-stack seismic data content.

Thus, the higher order seismic probe 315 is a collection of pre-stack, semblance or focusing gathers that belong to the same geographic location (e.g., CMP, CIP, shot, or receiver location). In a 3D canvas, this is the lateral location (X, Y), the time or depth (as appropriate) is the vertical axis and the fourth dimension is the offset for pre-stack gathers or velocity for semblance or focusing panels. When multi-azimuthal processing preserves the azimuths, the azimuths may become the fifth dimension. Exemplary higher order seismic probe types include: multi-azimuthal, pre-stack seismic probes; semblance probes; and focusing probes. Those in the art having the benefit of this disclosure will appreciate that other types of higher order seismic probes may be implemented in addition to, or in lieu of, those listed.

The invention admits wide variation in the seismic data types with which it may be employed. Table 1 presents several combinations of pre-stack and post-stack seismic data combinations with which the present invention may be employed in various alternative embodiments. Table 1 also presents the common geographical coordinate type that relates the pre-stack and post-stack seismic domains in the visualization. Those in the art having the benefit of this disclosure will appreciate still other combinations asides from those set forth in Table 1 with which the invention may be implemented.

TABLE 1

Exemplary Pre- and Post-Stack Seismic Data Combinations

| Pre-stack | Common Coordinate | Post-stack |
| --- | --- | --- |
| CMP gathers | CMP | Stack time |
| pre-stack time migrated CMP gathers | CMP | Migrated stack time |
| CMP gathers | CMP | (stacking) Velocity field |
| Pre-stack time migrated CMP gathers | CMP | Root Mean Square ("rms") velocity field |
| CCP gathers | CCP | PS stack time |
| Gamma scans (Vp/Vs semblance panels) | CCP | PP stack (with consistent time axis, i.e., after squeeze, stretch); PS stack, constant gamma PS stack |
| Semblance panels (velocity) | CMP | Stack time |
| Semblance panels (velocity) | CMP | Velocity field (in time) |
| Semblance panels (velocity) | CMP | One constant velocity stack |
| CIP gathers | CIP | Pre-stack depth migrated stack- |
| CIP gathers | CIP | Velocity model (in depth) |
| Focusing panels (velocity) | CIP | Pre-stack depth migrated stack- |
| Focusing panels (velocity) | CIP | Velocity model |
| CSGs (in time) | shot position | 3D shot navigation "volume" |
| CRG (in time) | receiver position | 3D receiver navigation "volume" |

Returning now to FIG. 3, the higher order probe 315 may be "attached" to the 3D reference system of the volume 305. Where the higher order probe 315 is attached, rotation, translation or zooming of the scene, e.g., the volume 305, will rotate, translate or zoom the higher order probe 315 in a locked position together with the post-stack seismic data. The higher order probe 315 will rotate at the selected geographical coordinate 320 as the scene is rotated as directed by the user or as programmed.

However, in alternative embodiments, the higher order probe 315 may be "detached" from the 3D reference system of the volume 305. The higher order probe 315 may be detached in order to be manipulated as an independent 3D object for rotation, translation, rescaling, "lime" (azimuth) slicing, setting visual attributes, etc. For instance, a user may set offset/velocity scales, azimuth directions, display selection (e.g., slicing the volume 305), artificially re-orient the gathers, interactive probe resize, zoom, etc. With respect to artificial reorientation, for one azimuth data display and manipulation, the user can orient the higher order probe 315 in its original azimuth direction or in an artificial azimuth direction, e.g., perpendicular to the original one. The detached higher order probe 315 can interactively move, or translate, to any new post-stack coordinate location with available pre-stack seismic data, as indicated by the ghosted lines 335.

Some embodiments may employ multiple independent higher order probes 315 in the same volume 305. In these embodiments, each higher order probe 315 is implemented in series using the method 400, i.e., a first higher order probe 315 is implemented, followed by a second, etc. The multiple independent higher order probes 315 will usually be implemented on the same pre-stack slice or seismic navigation line 310 of the volume 305 to ease display difficulties. For instance, if a first higher order probe 315 is implemented on a first slice 310 and a second higher order probe 315 is implemented on a second slice 310, it will be difficult to display the whole of both slices 310. Alternative approaches addressing this problem include displaying pertinent parts of the slices 310 using split screen or picture-in-picture techniques. More typically, however, the user can create a new slice, perhaps even on the fly, or navigation line that displays both higher order probes 315.

Figure 6:
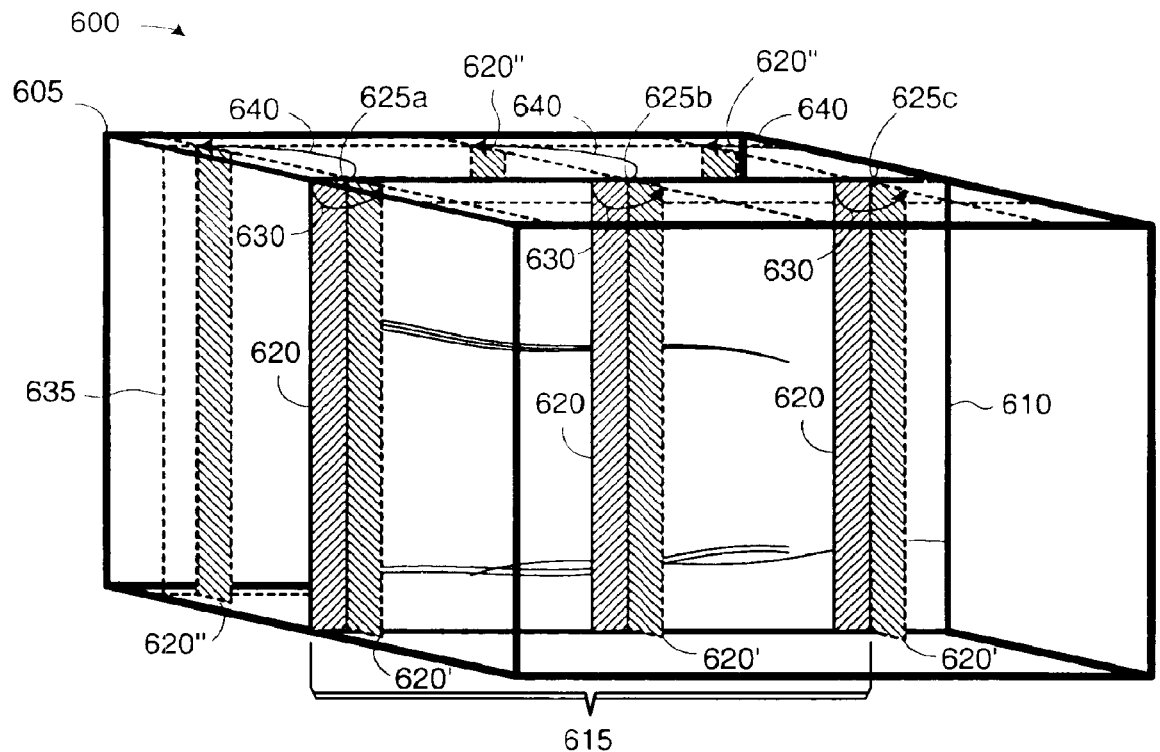
FIG. 6 depicts a conceptualized visualization of the geological formation of FIG. 1 in the form of a volume of seismic data in the post-stack seismic domain employing a collective higher order probe in accordance a second particular embodiment of the present invention.

Consider, for instance, the visualization 600 in FIG. 6. FIG. 6 depicts a conceptualized visualization 600 of the geological formation 105, shown in FIG. 1, in the form of a volume 605 of seismic data in the post-stack seismic domain, including a first "2D" slice 610. The slice 610 may alternatively be a pseudo-2D slice, i.e. a curvilinear section between two wells. A plurality of higher order probes 620 are shown already having been initiated and instantiated. Each higher order probe 620 comprises a frame 500, shown in FIG. 5, populated with pre-stack seismic gathers or velocity panels associated with the respective geographical locations 625a–625c. In FIG. 6, however, only a single azimuth of each higher order probe 620 is shown for the sake of clarity and so as not to obscure this aspect of the invention. Note that the higher order probes 620 extend the full vertical length of the slice 610. The higher order probes 620 can be initiated and instantiated in series, as described above. Furthermore, the higher order probes may all be attached, or all may be detached, or some may be attached and some detached. Each of the higher order probes 620 can then be independently manipulated.

In some situations, simultaneous visualization and/or manipulation of several higher order probes 315 in concert may be desirable in order to better tackle the lateral or volume coherency of the volume 305. Such situations include, e.g., visualizing all the in-lines or cross-lines or constant azimuth CIP gathers corresponding with the associated post-stack in-line, crossline or constant azimuth section/slice. Multiple dependent higher order probes 315 may be referred to as a "collective higher order probe," and is discussed more fully immediately below.

To implement a collective higher order probe, the user first assesses the available locations of the higher dimensional probes 315 with respect to the structural azimuth or dip of interest or other criteria of analysis. The user may then set a reference post-stack slice and define the number, dimension and characteristics of the higher order probes 315 to be displayed. The user can then attach, or lock, the previously initiated higher order probes 315 to the post-stack slice; such as when slicing through the post-stack volume, the corresponding higher order dimensional probes will be interactively instantiated. Alternatively, the user may slice through the offsets/azimuths of several higher order probes 315 to instantiate the associated constant offset/constant azimuth post-stack volume where it exists.

Returning to FIG. 6, the higher order probes 620, previously described as independent, can be locked together to create a collective higher order probe 615. Although the collective higher order probe 615 of the illustrated embodiment comprises three higher order probes 620, more or fewer numbers of higher order probes 620 may be employed. As mentioned above, each higher order probe 620 comprises a frame 500, shown in FIG. 5, populated with pre-stack seismic gathers or velocity panels associated with the respective geographical locations 625a–625c. Again, only a single azimuth of each higher order probe 620 is shown for the sake of clarity and so as not to obscure this aspect of the higher order probes 620 extend the full vertical length of the slice 610.

Referring now to both FIG. 6 and FIG. 4, the collective probe 615 is initiated (at 410) by the user specifying the 3D coordinates 625a–c for the higher order probes 620. The user also specifies the frame 500 with the dimensions and characteristics of the higher order probes 620 as discussed for the higher order probe 315, shown in FIG. 3, above. In the illustrated embodiment, the higher order probes 620 all exhibit the same dimensions and characteristics. This is not required for the practice of the invention, however, and the higher order probes 620 may exhibit unique dimensions and characteristics relative to the others in alternative embodiments. Once initiated, the collective higher order probe 615 is then instantiated (at 420) by populating the higher order probes 620 with pre-stack seismic data or velocity panels as discussed for the higher order probe 315, shown in FIG. 3, above.

In the illustrated embodiment, the collective higher order probe 615 is detached from the 3D coordinate system of the volume 605. The higher order probes 620 are also coupled so that, when the collective higher order probe 615 is manipulated, the higher order probes 620 are manipulated in lockstep. For instance, when the collective higher order probe 615 is rotated in azimuth, the higher order probes 620 are rotated, as indicated by the arrows 630 and ghosted lines, together in azimuth to the new azimuthal position 620'. The user does not need to rotate each higher order probe 620 individually. Thus, the embodiment of FIG. 6 implements an artificial azimuth collective probe reorientation. However, the invention is not so limited and alternative embodiments may be implemented in which higher order probes 620 are manipulated independently as multiple, independent higher order probes 315, shown in FIG. 3.

But, when a collective higher order probe 615 is implemented, it can be associated with a post-stack slice 610, 635, including a navigation line (not shown). Slicing through the post-stack volume 605 (e.g., from 610 to 635), or following "slicing" through sources or receivers navigation lines, will be accompanied with the corresponding collection of higher order seismic probes 620. Vice versa, sensible post-stack slice could accompany slicing through pre-stack location (i.e., offsets, azimuths or velocities). The sensible post-stack slices are common offset 3D seismic volumes when slicing through offsets (the azimuth is constant). Slicing through velocities would be related to constant velocity stacks volumes if they exist (i.e., usually in time only).

Another useful feature of the embodiment illustrated in FIG. 6 is employed in slicing the volume 605. One common analysis technique associated with visualizations is to "slice through" the volume and review data in different slices of the volume. In the embodiment of FIG. 6, the collective higher order probe 615 is instantiated automatically (i.e., without intervention from the user) in each slice as the user slices through the volume. Consider, for instance, a scenario where a user slices through the volume 605 from the slice 610 to a slice 635, shown in ghosted lines, as indicated by the arrows 640. As the user slices from the slice 610 to the slice 635, each of the collective probe 615, comprises of the rotated probe member 620' at this point, is automatically instantiated at the slice 635, as indicated by the translated, rotated higher order probes 620" shown in ghosted lines. Thus, the embodiment of FIG. 6 also implements common pre-stack and post-stack seismic data navigation.

The present invention may also be employed in interpretation as well as visualization. For instance, the present invention allows seeding the interpretation in any domain: pre-stack, semblance, focusing or post-stack seismic domains and then use appropriate mechanisms, whether manual or automated, to expand the interpretation in the associated domain. The process of "seeding" interpretation points in the post-stack seismic data is known, and any suitable technique may be used. Note, however, that by loading pre-stack 2D seismic data as post-stack 3D seismic data, the same post-stack interpretation mechanisms can be used for pre-stack data, but this approach is not applicable to 4D and 5D higher order probes.

Figure 7:
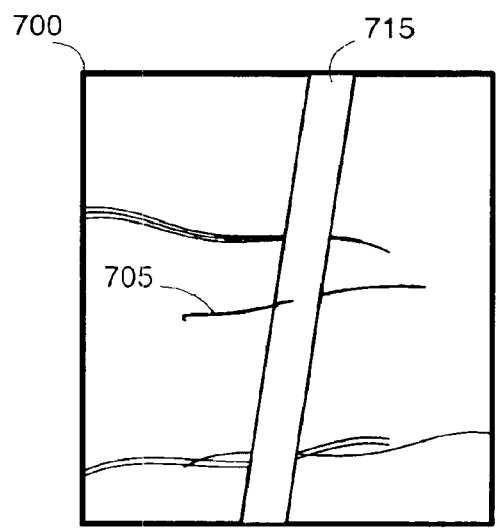
FIG. 7 and FIG. 8 illustrate alternative embodiments in which the seismic data is contemporaneously visualized and interpreted in both the pre-stack and post-stack seismic domains in accordance with a third embodiment of the present invention.
Figure 8:
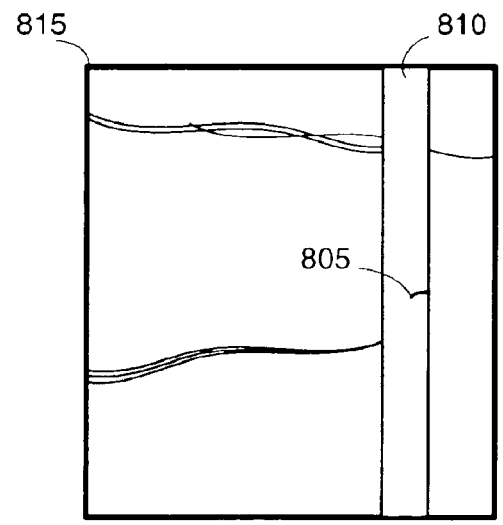

For example, performing a structural interpretation in the post-stack volume, a slice 700 of which is shown in FIG. 7, will automatically provide the corresponding (and geophysically consistent by construction) surface based pre-stack or velocity picking in 715. In FIG. 7, a structural interpretation seed 705 in the post-stack seismic domain 700, is spread into the pre-stack seismic domain found in the higher order probe 715 (only one azimuth of which is shown for clarity) for horizon consistent velocity analysis and more frequently velocity update. The inverse process will allow, for example, energies that have been recorded only on mid or far offsets, such as energies coming beneath salt, and have not been stacked properly, to contribute in building the missing bits of the structure. In this case, the usage of partial stack on mid- or far-offsets could be required and therefore slicing through those offsets could lead to instantiating the corresponding partial stack volumes. FIG. 8 illustrates how a mid- or far-offset seed 805 primary energies in the pre-stack seismic domain found in the higher order probe 810 (only one azimuth of which is shown for clarity), can help in reconstructing the missing bits of structure due to stacking with erroneous velocities or missing near offset reflections in the slice 815 of the post-stack seismic domain.

Note that the present invention will typically be implemented on an appropriately programmed computing device, e.g., the computing apparatus 200 in FIG. 2. The instructions may be encoded on, for example, the storage 210, the zip disk 217, and/or the optical disk 220 as the application program 265. Thus, in one aspect, the present invention includes a computing apparatus programmed to perform the method of the invention. In another aspect, the invention includes a program storage device encoded with instructions that, when executed by a computing apparatus, perform the method of the invention.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for contemporaneously utilizing seismic data in the pre-stack seismic domain and the post-stack seismic domain, comprising:
   initiating a higher order probe at a three-dimensional coordinate in a post-stack seismic volume; and
   instantiating a pre-stack seismic data content for the higher order probe.

2. The method of claim 1, wherein initiating the higher order probe from the three-dimensional coordinate includes initiating the higher order probe at a trace location in the post-stack seismic volume.

3. The method of claim 2, wherein the trace location comprises a binning location.

4. The method of claim 3, wherein the binning location comprises one of a common midpoint location, a common conversion point location or a common image point location.

5. The method of claim 2, wherein the trace location comprises a seismic navigation location.

6. The method of claim 5, wherein the seismic navigation comprises one of a common receiver location or a common shot location.

7. The method of claim 1, wherein initiating the higher order probe from the three-dimensional coordinate includes initiating the higher order probe at a velocity analysis location in the post-stack seismic volume.

8. The method of claim 1, wherein initiating the higher order probe at the velocity analysis location includes initiating the higher order probe at a velocity update location in the post-stack seismic volume.

9. The method of claim 7, wherein initiating the higher order probe at the velocity analysis location includes providing a map of analysis locations.

10. The method of claim 7, wherein the analysis location comprises one of a common midpoint location, a common conversion point and a common image point location.

11. The method of claim 7, wherein the velocity analysis location includes Vp, a Vs or a Vp/Vs velocity analysis location.

12. The method of claim 1, wherein initiating the higher order probe from the three-dimensional coordinate includes selecting a type for the higher order probe.

13. The method of claim 12, selecting the type for the higher order probe comprises selecting one of a common midpoint gather, a common conversion point gather, a common image point gather, a common shot gather, a common receiver gather, a semblance panel, a gamma scan and a focusing panel.

14. The method of claim 1, wherein initiating the higher order probe from the three-dimensional coordinate includes setting a multi-dimensional frame.

15. The method of claim 14, wherein setting the multi-dimensional frame includes graphically setting the multi-dimensional frame.

16. The method of claim 14, wherein setting the multi-dimensional frame includes setting at least one of time window, depth window, offset/velocity range, offset/velocity scale, trace decimation, azimuths, and azimuth artificial reorientation.

17. The method of claim 1, wherein instantiating the higher order probe at the three-dimensional coordinate includes attaching the collective higher order probe to the three-dimensional reference system.

18. The method of claim 17, further comprising:
   rotating, translating or zooming in or our the scene; and
   rotating, translating or zooming in or out the higher order probe with the scene.

19. The method of claim 1, wherein instantiating the higher order probe at the three-dimensional coordinate includes detaching the higher order probe from the three-dimensional reference system.

20. The method of claim 19, further comprising manipulating the detached higher order probe.

21. The method of claim 20, wherein manipulating the detached higher order probe includes at least one of rotation, translation, rescaling, slicing, and setting visual attributes.

22. The method of claim 1, further comprising:
   initiating at least one secondary higher order probe at secondary three-dimensional coordinates in the post-stack seismic volume; and
   instantiating the secondary pre-stack seismic data content for the secondary higher order probe.

23. The method of claim 22, wherein initiating the second higher order probe includes initiating a higher order probe independent of the first higher order probe.

24. The method of claim 22, wherein the first and secondary higher order probes comprise a collective probe.

25. The method of claim 22, wherein initiating the second higher order probe includes initiating a higher order probe dependent on the first higher order probe.

26. The method of claim 1, further comprising:
   slicing through the post-stack seismic domain; and
   automatically instantiating the higher ardor probe on each slice while slicing through the post-stack seismic domain.

27. The method of claim 1, further comprising:
   seeding with interpretation at least one of the pro-stack seismic domain and the post-stack seismic domain; and
   spreading the interpretation in the other domain.

28. A program storage medium encoded with instructions that, when executed by a computer, perform a method for contemporaneously utilizing seismic data in the pre-stack seismic domain and the post-stack seismic domain, the method comprising:
   initiating a higher order probe at a three-dimensional coordinate in a post-stack seismic volume; and
   instantiating a pre-stack seismic data content for the higher order probe.

29. The program storage medium of claim 28, wherein initiating the higher order probe from the three-dimensional coordinate in the encoded method Includes initiating the higher order probe at a trace location in the post-stack seismic volume.

30. The program storage medium of claim 28, wherein initiating the higher order probe from the three-dimensional coordinate in the encoded method includes initiating the higher order probe at a velocity analysis location in the post-stack seismic volume.

31. The program storage medium of claim 28, wherein initiating the higher order probe from the three-dimensional coordinate in the encoded method includes selecting a type for the higher order probe.

32. The program storage medium of claim 28, wherein initiating the higher order probe from the three-dimensional coordinate in the encoded method includes setting a multi-dimensional frame.

33. The program storage medium of claim 28, wherein instantiating the higher order probe at the three-dimensional coordinate in the encoded method includes attaching the collective higher order probe to the three-dimensional reference system.

34. The program storage medium of claim 28, wherein instantiating the higher order probe at the three-dimensional coordinate in the encoded method includes detaching the higher order probe from the three-dimensional reference system.

35. The program storage medium of claim 28, wherein the encoded method further comprises:
    initiating at least one secondary higher order probe at secondary three-dimensional coordinates in the post-stack seismic volume; and
    instantiating the secondary pre-stack seismic data content for the secondary higher order probe.

36. The program storage medium of claim 28, wherein the encoded method further comprises:
    slicing through the post-stack seismic domain; and
    automatically instantiating the higher order probe on each slice while slicing through the post-stack seismic domain.

37. The program storage medium of claim 28, wherein the encoded method further comprises:
    seeding with interpretation at least one of the pre-stack seismic domain and the post-stack seismic domain; and
    spreading the interpretation in the other domain.

38. A computing apparatus programmed to perform a method for contemporaneously utilizing seismic data in the pre-stack seismic domain and the post-stack seismic domain, the method comprising:
    initiating a higher order probe at a three-dimensional coordinate in a post-stack seismic volume; and
    instantiating a pre-stack seismic data content for the higher order probe.

39. The computing apparatus of claim 38, wherein initiating the higher order probe from the three-dimensional coordinate in the programmed method includes initiating the higher order probe at a trace location in the post-stack seismic volume.

40. The computing apparatus of claim 38, wherein initiating the higher order probe from the three-dimensional coordinate in the programmed method includes initiating the higher order probe at a velocity analysis location in the post-stack seismic volume.

41. The computing apparatus of claim 38, wherein initialing the higher order probe from the three-dimensional coordinate in the programmed method includes selecting a type for the higher order probe.

42. The computing apparatus of claim 38, wherein initiating the higher order probe from the three-dimensional coordinate in the programmed method includes setting a multi-dimensional frame.

43. The computing apparatus of claim 38, wherein instantiating the higher order probe at the three-dimensional coordinate in the programmed method includes attaching the collective higher order probe to the three-dimensional reference system.

44. The computing apparatus of claim 38, wherein instantiating the higher order probe at the three-dimensional coordinate in the programmed method includes detaching the higher order probe from the three-dimensional reference system.

45. The computing apparatus of claim 38, in the programmed method further comprises:
    initiating at least one secondary higher order probe at secondary three-dimensional coordinates in the post-stack seismic volume; and
    instantiating the secondary pre-stack seismic data content for the secondary higher order probe.

46. The computing apparatus of claim 38, in the programmed method further comprises:
    slicing through the post-stack seismic domain; and
    automatically instantiating the higher order probe on each slice while slicing through the post-stack seismic domain.

47. The computing apparatus of claim 38, wherein the programmed method further comprises:
    seeding with interpretation at least one of the pre-stack seismic domain and the post-stack seismic domain; and
    spreading the interpretation in the other domain.

48. A method for contemporaneously navigating seismic data in the pre-stack seismic domain and the post-stack seismic domain, comprising:
    initiating a collective higher order probe at a plurality of three-dimensional coordinates in the post-stack seismic volume;
    instantiating a pre-stack seismic data content for the collective higher order probe;
    slicing through the post-stack seismic domain; and
    automatically instantiating the collective higher order probe on each slice while slicing through the post-stack seismic domain.

49. The method of claim 48, wherein initiating the collective higher order probe from the three-dimensional coordinates includes initiating the collective higher order probe at a plurality of trace locations in the post-stack seismic volume.

50. The method of claim 48, wherein initiating the collective higher order probe from the three-dimensional coordinates includes initiating the collective higher order probe at a plurality of velocity analysis locations in the post-stack seismic volume.

51. The method of claim 48, wherein initiating the collective higher order probe at the velocity analysis locations includes initiating the collective higher order probe at a plurality of velocity update locations in the post-stack seismic volume.

52. The method of claim 48, wherein initiating the collective higher order probe from the three-dimensional coordinates includes selecting a type for the collective higher order probe.

53. The method of claim 48, wherein instantiating the collective higher order probe at the three-dimensional coordinates includes attaching the collective higher order probe to the three-dimensional reference system.

54. The method of claim 48, wherein instantiating the collective higher order probe at the three-dimensional coordinates includes detaching the collective higher order probe from the three-dimensional reference system.

55. A method for contemporaneously interpreting seismic data in the pre-stack seismic domain and the post-stack seismic domain, comprising:

initiating a higher order probe at a three-dimensional coordinate in a post-stack seismic volume;

instantiating a pre-stack seismic data content for the higher order probe; and seeding at least one of the pre-stack seismic domain and the post-stack seismic domain from the other.

56. The method of claim 55, wherein initiating the higher order probe from the three-dimensional coordinate includes initiating the higher order probe at a trace location in the post-stack seismic volume.

57. The method of claim 55, wherein initiating the higher order probe from the three-dimensional coordinate includes initiating the higher order probe at a velocity analysis location in the post-stack seismic volume.

58. The method of claim 55, wherein initiating the higher order probe at the velocity analysis location includes initiating the higher order probe at a velocity update location in the post-stack seismic volume.

59. The method of claim 55, wherein initiating the higher order probe from the three-dimensional coordinate includes selecting a type for the higher order probe.

60. The method of claim 55, wherein initiating the higher order probe from the three-dimensional coordinate includes setting a multi-dimensional frame.

61. The method of claim 55, wherein instantiating the higher order probe at the three-dimensional coordinate includes attaching the collective higher order probe to the three-dimensional reference system.

62. The method of claim 55, wherein instantiating the higher order probe at the three-dimensional coordinate includes detaching the higher order probe from the three-dimensional reference system.

63. The method of claim 55, further comprising:

initiating at least one secondary higher order probe at a secondary three-dimensional coordinates in the post-stack seismic volume; and instantiating the secondary pre-stack seismic data content for the secondary higher order probe.

64. The method of claim 55, further comprising:

slicing through the post-stack seismic domain; and automatically instantiating the higher order probe on each slice while slicing through the post-stack seismic domain.

* * * * *